(12) United States Patent
Sun

(10) Patent No.: US 10,152,085 B2
(45) Date of Patent: Dec. 11, 2018

(54) HOUSING FOR DISPLAY DEVICE AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventor: Li Sun, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/549,999

(22) PCT Filed: Apr. 10, 2017

(86) PCT No.: PCT/CN2017/079930
§ 371 (c)(1),
(2) Date: Aug. 9, 2017

(87) PCT Pub. No.: WO2017/202149
PCT Pub. Date: Nov. 30, 2017

(65) Prior Publication Data
US 2018/0232008 A1    Aug. 16, 2018

(30) Foreign Application Priority Data
May 27, 2016   (CN) .......................... 2016 1 0366347

(51) Int. Cl.
*G06F 1/16* (2006.01)
*G02F 1/1335* (2006.01)
*G02F 1/1333* (2006.01)

(52) U.S. Cl.
CPC ...... *G06F 1/1637* (2013.01); *G02F 1/133305* (2013.01); *G02F 1/133526* (2013.01)

(58) Field of Classification Search
CPC combination set(s) only.
See application file for complete search history.

(56) References Cited

U.S. PATENT DOCUMENTS 7,787,097 B2 *  8/2010  Satoh ............... G02F 1/133305
                                                349/158
7,868,545 B2 *  1/2011  Hioki ............... G02F 1/133526
                                                257/59

(Continued)

FOREIGN PATENT DOCUMENTS

CN        101133434 A      2/2008
CN        104714699 A      6/2015
(Continued)

OTHER PUBLICATIONS

International Search Report and Written Opinion dated May 27, 2017, for corresponding PCT Application No. PCT/CN2017/079930.

(Continued)

*Primary Examiner* — Lisa Lea Edmonds
(74) *Attorney, Agent, or Firm* — Kinney & Lange, P.A.

(57) ABSTRACT

A housing for a display device is disclosed. The housing includes a back plate configured to be deformable to change its curvature; and at least one curvature retaining unit located on a first side of the back plate that is convex when the back plate is bent. Each curvature retaining unit includes a plurality of supporting members arranged in a row, a first side of each of the supporting members is pivotably mounted to the back plate, and each curvature retaining unit has a non-supporting state and a supporting state. In the non-supporting state of the curvature retaining unit, the back plate is in a flat state; and in the supporting state of the (Continued)

curvature retaining unit, two opposite sides of adjacent supporting members abut against each other such that the back plate is in a bent shape. Moreover, a display device having the housing is disclosed.

20 Claims, 4 Drawing Sheets

(56) References Cited

U.S. PATENT DOCUMENTS

| | | | | |
|---|---|---|---|---|
| 9,116,662 | B1* | 8/2015 | Song | G06F 1/1601 |
| 9,123,290 | B1* | 9/2015 | Cho | G06F 1/1652 |
| 9,182,620 | B1* | 11/2015 | Yu | G06F 1/1601 |
| 9,274,560 | B2* | 3/2016 | Ahn | G06F 1/1679 |
| 9,282,667 | B2* | 3/2016 | Song | H05K 7/02 |
| 9,304,539 | B2* | 4/2016 | Song | G06F 1/1601 |
| 9,307,658 | B2* | 4/2016 | Song | H05K 5/0217 |
| 9,395,758 | B2* | 7/2016 | Zhang | G06F 1/1601 |
| 9,500,856 | B2* | 11/2016 | Yoshikawa | G02B 26/0825 |
| 9,510,469 | B2* | 11/2016 | Song | H05K 5/0217 |
| 9,727,080 | B2* | 8/2017 | Jung | G06F 1/1601 |
| 9,730,342 | B2* | 8/2017 | Lee | H05K 5/0217 |
| 9,746,701 | B2* | 8/2017 | Sung | G09F 9/301 |
| 9,864,221 | B2* | 1/2018 | Lee | G02F 1/133305 |
| 9,978,293 | B2* | 5/2018 | Cho | H05K 5/0217 |
| 9,983,428 | B2* | 5/2018 | Im | G02F 1/133308 |
| 10,019,036 | B2* | 7/2018 | Sun | G06F 3/041 |
| 10,025,347 | B2* | 7/2018 | Song | G06F 1/1601 |
| 2008/0018631 | A1 | 1/2008 | Hioki et al. | |
| 2008/0055831 | A1 | 3/2008 | Satoh | |
| 2013/0155655 | A1* | 6/2013 | Lee | H05K 5/03 362/97.1 |
| 2014/0003006 | A1* | 1/2014 | Ahn | G06F 1/1652 361/749 |
| 2014/0099479 | A1* | 4/2014 | Krall | B32B 3/14 428/174 |
| 2014/0226266 | A1* | 8/2014 | Kang | H01L 51/0097 361/679.01 |
| 2015/0092361 | A1* | 4/2015 | Cho | H02K 7/00 361/749 |
| 2016/0044806 | A1* | 2/2016 | Park | G02F 1/133305 361/679.01 |
| 2017/0192460 | A1* | 7/2017 | Watanabe | G09F 9/00 |
| 2017/0205658 | A1* | 7/2017 | Jung | H04N 5/64 |
| 2017/0265317 | A1* | 9/2017 | Sun | G09F 9/301 |
| 2017/0285391 | A1* | 10/2017 | Zhang | G02B 6/0045 |

FOREIGN PATENT DOCUMENTS

| | | |
|---|---|---|
| CN | 105044957 A | 11/2015 |
| CN | 106061154 A | 10/2016 |
| WO | 2015030432 A1 | 3/2015 |

OTHER PUBLICATIONS

First Chinese Office Action dated May 28, 2018, for corresponding Chinese Application No. 201610366347.7.

* cited by examiner

HOUSING FOR DISPLAY DEVICE AND DISPLAY DEVICE

CROSS-REFERENCE TO RELATED APPLICATION

This application is a Section 371 National Stage Application of International Application No. PCT/CN2017/079930, filed on 10 Apr. 2017, entitled "HOUSING FOR DISPLAY DEVICE AND DISPLAY DEVICE", which claims priority to Chinese Application No. 201610366347.7, filed on 27 May 2016, incorporated herein by reference in its entirety.

TECHNICAL FIELD

The present disclosure relates to the field of display technologies, and especially, to a housing and a display device having the housing.

BACKGROUND

With development of display technologies, curved surface display devices have become popular and appeared in consumption market. A curved surface screen bending inwards is more adapted to the physiological structure of a human's eye ball, and a depth of field generated by bending the screen makes a picture richer in level and detail and more real, so that a viewer may feel like he is in the picture. The curved surface screen may effectively reduce a difference between a distance from a picture at a side edge of the screen to the viewer's eye and a distance from a picture at a central part of the screen to the viewer's eye, so that an even more uniform image can be obtained and a range of view may be increased.

Curvature of a curved surface display device may need to be adjusted in some certain occasions, for example, if there are relatively too much viewers, some viewers at positions away from a center or a central vertical axis of the curved surface will have an asymmetrical viewing angle, which leads to a decreased viewing effect. In this case, curvature of the display panel needs to be decreased, or the display panel may even need to be restored to a flat state, so as to ensure a good viewing effect.

In existing technologies, a curved surface display device having an adjustable curvature is usually provided with an adjusting mechanism mounted to its back plate for adjusting the curvature of the display panel. The adjusting mechanism may apply forces at both ends of the back plate to bend the back plate, and the curvature of the backplate may be changed by adjusting values of the forces applied by the adjusting mechanism, so that the display panel is bent and deformed by the back plate, and adjustment of curvature of the display panel is achieved.

Usually, the adjusting mechanism also functions to maintain the bent shape of the display panel after the curvature of the display panel is adjusted. However, due to deformation characteristics of the back plate and the display panel and other factors, the curved shape of the back plate and the display panel maintained by the adjusting mechanism is not consistent with a curved shape that is suitable for watching, and viewing effect is thereby reduced.

SUMMARY

In order to at least partially overcome the problems of existing technical solutions, a housing for a display device and the display device are provided in the present disclosure. The housing can retain curved shape of a display panel which is suitable for watching, after a curvature of the display panel has been adjusted, so as to improve a viewing effect of the display device.

In one aspect of the present disclosure, a housing for a display device is disclosed.

In an exemplary embodiment, the housing may comprise: a back plate configured to be deformable to change its curvature; and at least one curvature retaining unit located on a convex side of the back plate in the case of the back plate being bent. Each curvature retaining unit includes a plurality of supporting members arranged in a row, a first side of each of the supporting members is pivotably mounted to the back plate, each curvature retaining unit has a non-supporting state in which the back plate is in a flat state and a supporting state in which two opposite sides of adjacent supporting members abut against each other such that the back plate is in a bent shape.

According to another embodiment, each of the supporting members may be of a plate-shaped structure and has the first side, a second side, and two inclined sides; the first side and the second side are arranged opposite to one another, and a length of the second side is larger than a length of the first side; the first side of each of the supporting members is mounted to the back plate, one of the two inclined sides is connected with one end of the first side and one end of the second side, and the other one of the two inclined sides is connected to the other end of the first side and the other end of the second side.

According to another embodiment, in each of the supporting members, the two inclined sides may be symmetrical about a central line extending in a direction from the first side towards the second side, and a distance between each of the inclined sides and the central line gradually increases along the direction from the first side towards the second side.

According to another embodiment, each of the supporting members may have a shape of an isosceles trapezoid or an annular sector.

According to another embodiment, in each curvature retaining unit, the first side of each of the supporting members is articulated to the back plate, and a pivot axis of an articulating device may be consistent with an extending direction of the curvature retaining unit.

According to another embodiment, the supporting members may be made of glass, metal, carbon fiber or organic glass; and/or the back plate is made of glass, metal, carbon fiber or organic glass.

According to another embodiment, a thickness of each of the supporting member is 0.5 to 10 times of a thickness of the back plate.

According to another embodiment, a plurality of the curvature retaining units arranged in parallel with each other may be mounted to the back plate, and each of the curvature retaining units is configured to, in the supporting state, retain the bent shape of the back plate in the same curvature.

According to another embodiment, a plurality of the curvature retaining units arranged in parallel with each other may be mounted to the back plate, and at least one of the curvature retaining units is configured to, in the supporting state, retain a bent shape of a portion of the back plate in a curvature different from that of a bent shape of another portion of the back plate when the back plate is retained by another curvature retaining unit in the supporting state.

According to another embodiment, a part of the back plate may be provided with at least one first curvature retaining unit, and another part of the back plate is provided with at least one second curvature retaining unit, the first curvature retaining unit and the second curvature retaining unit extend in the same direction and are spaced apart by a distance.

In another aspect of the present disclosure, there is provided a display device.

In an exemplary embodiment, the display device comprise: a flexible display panel being elastically deformable to change its curvature; and the housing according to any one of the above embodiments. The display panel and the curvature retaining unit are respectively mounted at two opposite sides of the housing.

DETAILED DESCRIPTION OF EMBODIMENTS

Technical solutions of embodiments of the present disclosure will be described hereinafter explicitly and fully with reference to the attached drawings therein. The present disclosure may, however, be embodied in many different forms and therefore the embodiments set forth herein should not be construed as being a limitation to the present disclosure. Rather, these embodiments are provided so that those skilled in the art could fully and completely understand the concept of the disclosure.

Figure 1:
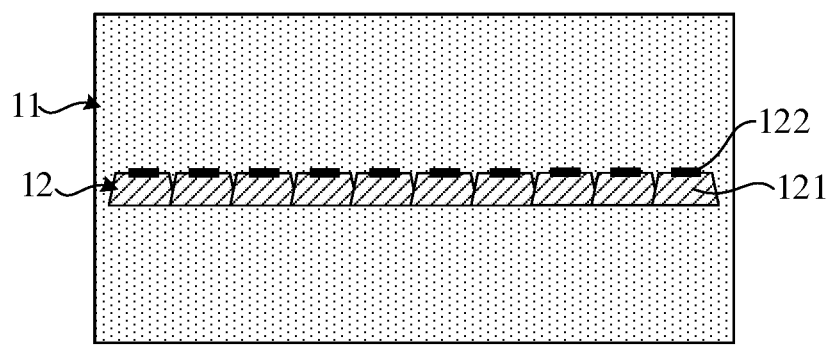
FIG. 1 is a schematic rear view of a housing of a display device according to an exemplary embodiment of the present disclosure, where a back plate of the housing is in a flatted state.
Figure 2:
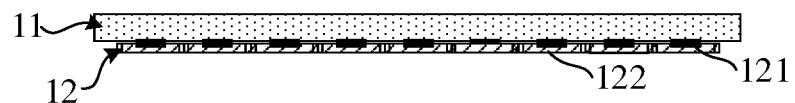
FIG. 2 is a schematic top view of the housing of the display device as shown in FIG. 1.
Figure 3:
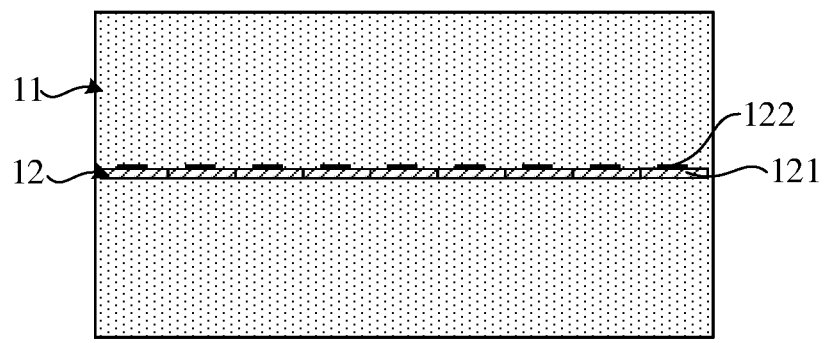
FIG. 3 is a schematic rear view of the housing of the display device according to the exemplary embodiment of the present disclosure, where the back plate of the housing is in a curved state.
Figure 4:
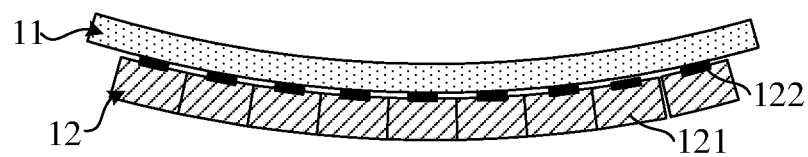
FIG. 4 is a schematic top view of the housing of FIG. 3.

Referring to FIG. 1 to FIG. 5, a housing 10 for a display device is provided according to an exemplified embodiment of the present disclosure. The housing 10 includes a back plate 11 and at least one curvature retaining unit 12. FIG. 2 is a schematic structural drawing showing that the back plate 11 is not deformed, and FIG. 4 is a schematic structural drawing showing that the back plate 11 is deformed. The back plate 11 is constructed or configured to be deformable to change its curvature. In one example, the back plate 11 is configured to be deformable elastically under an external force, and when the external force is removed, the black plate may be restored to its original shape before the deformation by its own elasticity. The at least one curvature retaining unit 12 is located on a convex side of the back plate 11 in the case of the back plate 11 being bent, and each curvature retaining unit 12 includes at least one row of supporting members 121. An extension direction of the row of supporting members 121 is perpendicular to an axis about which the back plate 11 is bent.

Figure 5:
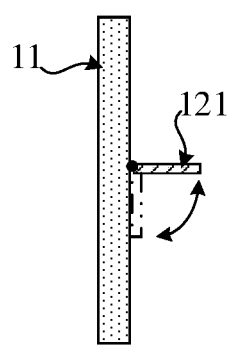
FIG. 5 is a schematic view showing states of a supporting member of the housing for the display device according to the exemplary embodiment of the present disclosure, where the solid line indicates a supporting state of the supporting member, and the dot dash line indicates a non-supporting state of the supporting member.

FIG. 5 is a schematic drawing showing possible states a single supporting member 121 located at a back side of the back plate 11 would have, where the solid line indicates a supporting state of the supporting member, and the dot dash line indicates a non-supporting state of the supporting member. Referring to FIGS. 1 to 6, a first side 1211 of each supporting member 121 is pivotably mounted to the back plate 11 through an articulated shaft 122, and the supporting member may rotate about the articulated shaft 122 in a directed indicated by the arrow shown in FIG. 5, between the supporting state indicated by the solid line and the non-supporting state indicated by the dot dash line. When the supporting member 121 is in the supporting state, it is substantially perpendicular to the back plate 11, and when the supporting member 121 is in the non-supporting state, it suspends downwards under the effect of gravity. During operation, when the display device (or the housing of the display device) needs to be bent, each of the supporting members of the curvature retaining unit 12 may be adjusted to the supporting state manually or by using other tools or mechanisms. Specifically, through bending the back plate 11, side surfaces of two adjacent supporting members 121 of the curvature retaining unit 12 may abut against each other. When the back plate is bent to a proper state, a side surface of each supporting member 121 abuts against a side surface of an adjacent supporting member, so as to prevent the back plate from restoring back to its unbent flat state. When the back plate needs to be restored to its flat state, side surfaces of adjacent supporting members of the curvature retaining unit 12 may be disengaged manually or by using other tools or mechanisms, such that the curvature retaining unit 12 cannot provide a supporting force to the back plate to retain its bent state, and the back plate may thereby restore to its flat state.

As shown in FIGS. 1 and 2, when the back plate 11 is in its flat state, the back plate 11 is not deformed, each curvature retaining unit 12 is in the non-supporting state, and at this time, each of the supporting members 121 may be suspended naturally under the effect of gravity, or in other embodiments, these supporting members may be held by other mechanism substantially in a state against the back plate 11 or an adjacent supporting member. Two opposite side surfaces of every two adjacent supporting members 121 do not abut against each other, and because of their specific shapes, side surfaces of adjacent supporting members 121 may be lapped over one another, which will be described in detail hereinafter. It can be appreciated that the back plate 11 may be made of a material capable of being elastically deformed, such that when the curvature retaining unit 12 is switched from the supporting state to the non-supporting state, the back plate may easily restore to its non-deformed state.

As shown in FIGS. 3 and 4, when the back plate 11 is in the bent state under an external force, the curvature retaining unit 12 is in the supporting state, and each supporting member 121 in each row of supporting members 121 of the curvature retaining unit 12 in the supporting state is perpendicular to the back plate 11, and two opposite side surfaces of every two adjacent supporting members 121 abut against each other. In this condition, a plurality of supporting members 121 are arranged along a curved line, so as to retain the curved shape of the back plate 11.

Because a restoring force generated when the back plate is bent is counteracted by the plurality of supporting members 121 of the curvature retaining unit 12, the plurality of supporting members 121 of the curvature retaining unit 12 may apply uniform forces to the back plate 11, as compared with an existing technical solution in which the back plate 11 is bent and deformed by applying forces at two ends thereof, such that the back plate 11 may be bent into a regularly curved shape and the curved shape that is suitable for watching may also be retained.

Figure 6:
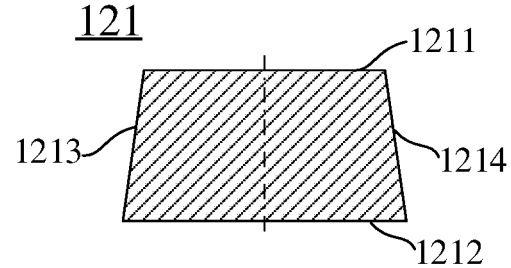
FIG. 6 is a schematic view showing a supporting member according to an embodiment of the present disclosure.

In an embodiment of the supporting member shown in FIG. 6, each supporting member 121 has a plate-shaped structure, and the supporting member 121 has a first side 1211, a second side 1212, a first inclined side 1213 and a second inclined side 1214. The first side 1211 and the second side 1212 are disposed opposite to one another, and a length of the second side 1212 is larger than a length of the first side 1211. The first side 1211 of the supporting member 121 is mounted to the back plate 11, the first inclined side 1213 connects one end of the first side 1211 and one end of the second side 1212, and the second inclined side 1214 connects the other end of the first side 1211 and the other end of the second side 1212.

In one example, as shown in FIG. 6, in order to facilitate manufacture, in each supporting member 121, the first inclined side 1213 and the second inclined side 1214 are symmetrical about a central line extending in a direction from the first side 1211 towards the second side 1212, and a distance between the first inclined side 1213 and the central line and a distance between the second inclined side 1214 and the central line gradually increase along the direction from the first side 1211 towards the second side 1212.

In one example, as shown in FIG. 6, the supporting member 121 is of a plate structure having a shape of an isosceles trapezoid. Referring FIG. 4, a plurality of isosceles trapezoid shaped supporting members 121 are arranged in sequence, and when opposite inclined sides of every two adjacent supporting members 121 abut against each other, the curvature retaining unit 12 is presented in a shape of a curve.

The supporting member 121 may also have a shape of an annular sector, instead of having the shape shown in FIG. 6.

In an exemplary embodiment, in each curvature retaining unit 12, the first side 1211 of each supporting member 121 is articulated to the back plate 11, and a pivot axis of an articulating device may be consistent with the extending direction of the curvature retaining unit 12.

In order to increase the strength of the supporting member 121, in an exemplary embodiment, the supporting member 121 is made of materials such as glass, metal, carbon fiber composite material, organic glass or the like, and at the same time, the back plate 11 may also be made of materials such as glass, metal, carbon fiber, organic glass or the like, so as to increase the strength of the back plate 11.

In an exemplary embodiment, a thickness of the supporting member 121 may be 0.5 to 10, for example, 0.5, 1, 2, 3, 5, 8, 10, times of a thickness of the back plate 11.

Figure 7:
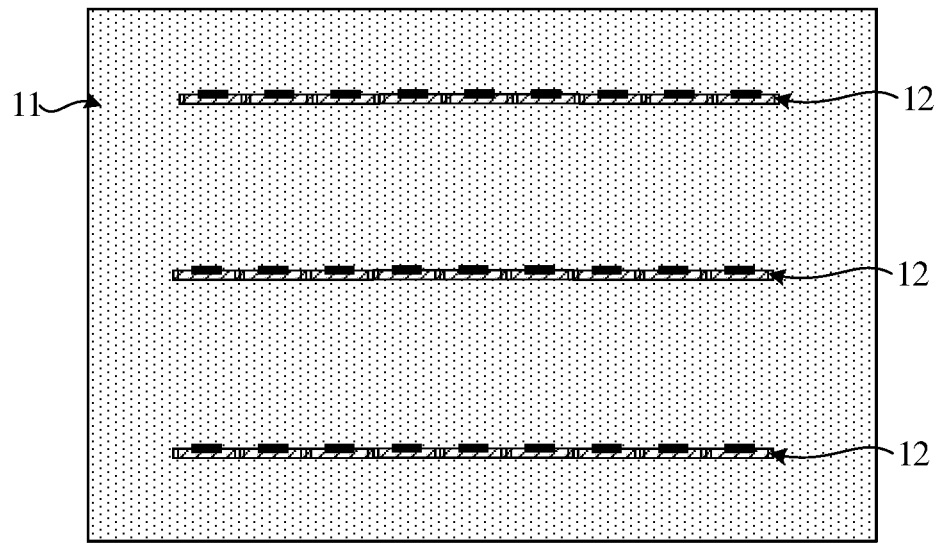
FIG. 7 is a schematic rear view of a housing of the display device according to another embodiment of the present disclosure.
Figure 8:
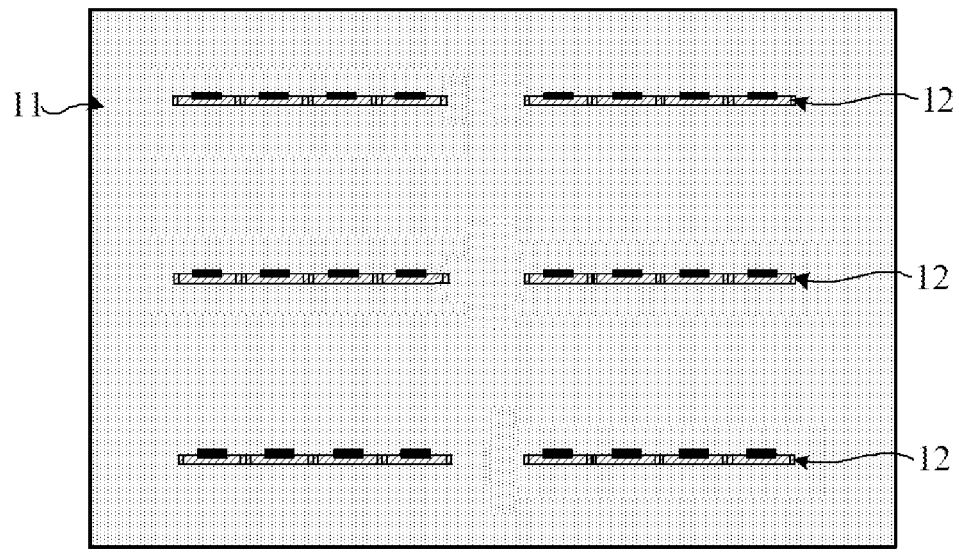
FIG. 8 is a schematic rear view of a housing of the display device according to a further embodiment of the present disclosure.

In another embodiment, the back plate 11 may be provided with a plurality of curvature retaining units 12. As shown in FIG. 7, the back plate 11 may be provided with three curvature retaining units 12 mounted in parallel with each other, and the supporting members 121 in each of the curvature retaining units 12 are arranged in the horizontal direction. According to practical requirement, the number of the curvature retaining units 12 may be larger or smaller than 3. Further, the plurality of curvature retaining units may also be arranged at the same vertical height and spaced apart by a certain distance. For example, a left part of the back plate may be provided with one or more curvature retaining units, and a right part of the back plate may also be provided with one or more curvature retaining units, such that curvature of the left part and curvature of the right part of the back plate can be adjusted independently and the left and right parts can be supported separately, as shown in FIG. 8.

In the above mentioned three curvature retaining units 12, in order to improve uniformity of forces applied on the back plate 11 when the curvature retaining units are in the supporting state, each of the curvature retaining units 12 is configured to retain the bent shape of the back plate 11 in the same curvature when the curvature retaining units 12 are in the supporting state.

Alternatively, in order to cause the back plate 11 to have different curvatures, in the three curvature retaining units 12, at least one of the curvature retaining units 12 is configured to, in the supporting state, retain a bent shape of a portion of the back plate 11 to have a curvature different from that of a bent shape of another portion of the back plate 11 when it is retained by another curvature retaining unit 12 in the supporting state. In one example, the curvature retaining units 12 are located at a central part of the back plate 11.

Generally, as shown in FIGS. 3-4, the back plate 11 is rectangular and supports a display panel vertically, and the back plate may be bent and deformed about a vertical axis, therefore, the supporting members 121 are arranged in the horizontal direction.

Figure 9:
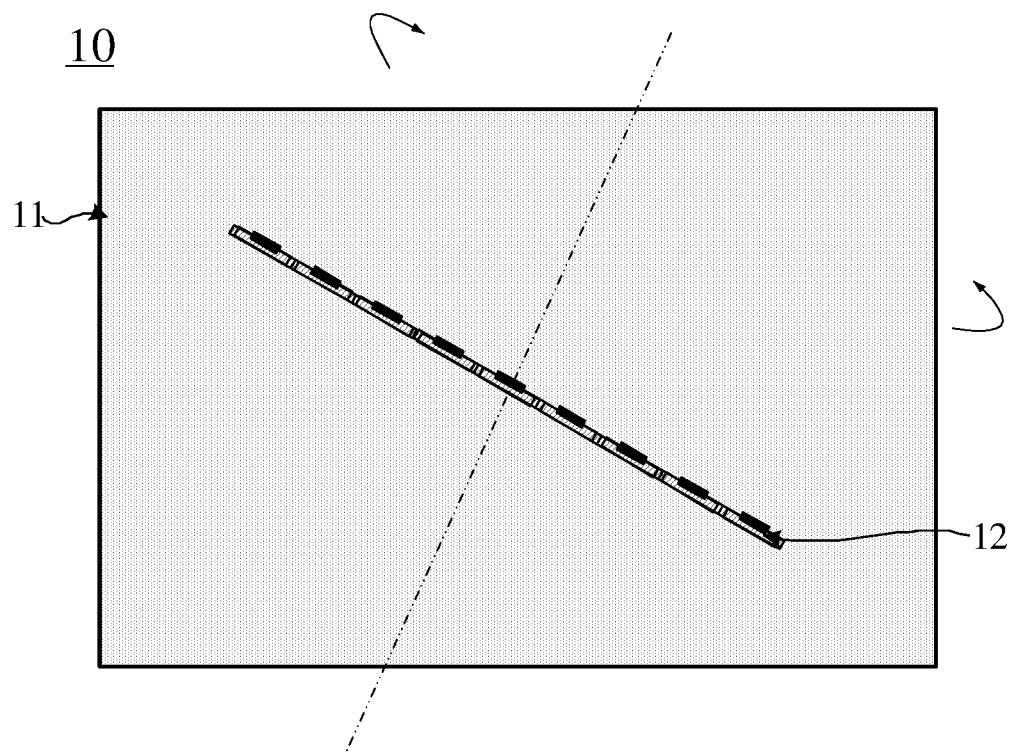
FIG. 9 is a schematic rear view of a housing of the display device according to a still further embodiment of the present disclosure.

In some special occasion and if it is needed, the supporting members 121 may also be arranged to extend in a non-horizontal direction. For example, in the embodiment shown in FIG. 9, the supporting members 121 of the curvature retaining unit 12 are arranged in a direction at an angle with respect to the horizontal direction, and in this circumstance, the back plate 11 is bent about a non-vertical axis.

Figure 10:
FIG. 10 is a schematic view of a display device according to an embodiment of the present disclosure.

According to a specific embodiment of the present disclosure, there is further provided a display device 20, as shown in FIG. 10, which includes a flexible display panel 30 capable of being elastically deformed under an external force so as to change its curvature. The display panel may be a liquid crystal display panel or an OLED display panel. In one example it is an OLED display panel. The display device 20 further includes the above described housing 10 for the display device, and the display panel 30 is mounted at a side of the back plate 11 facing away from the curvature retaining unit 12.

Curvature of the display panel in the display device may change with the change of curvature of the back plate 11 of the housing 10 for the display device, and may remain unchanged when the curvature retaining unit of the housing 10 of the display device is in the supporting state, so as to be adapted to different occasions. When the display panel is in the bent state, at least one curvature retaining unit 12 may be in the supporting state, so as to maintain the display panel in the bent state.

Because a restoring force generated when the display panel is bent is counteracted by the plurality of supporting members 121 of the curvature retaining unit 12, the plurality of supporting members 121 of the curvature retaining unit 12 may apply uniform forces to the display panel, as compared with an existing technical solution in which the display panel is bent and deformed by applying forces at two ends thereof, such that the display panel may be bent into a regularly curved shape and the curved shape that is suitable for watching may also be retained.

Although several exemplary embodiments have been shown and described in conjunction with the accompanying drawings, it would be appreciated by those skilled in the art that various changes or modifications may be made in these embodiments without departing from the principles and spirit of the disclosure, the scope of which is defined in the claims and their equivalents.

What is claimed is:

1. A housing for a display device, comprising:
a back plate configured to be deformable to change its curvature; and
at least one curvature retaining unit located on a first side of the back plate that is convex when the back plate is bent,
wherein each curvature retaining unit includes a plurality of supporting members arranged in a row, a first side of each of the supporting members is pivotably mounted to the back plate, each curvature retaining unit has a non-supporting state in which the back plate is in a flat state and a supporting state in which two opposite sides of adjacent supporting members abut against each other such that the back plate is in a bent shape.

2. The housing according to claim 1, wherein each of the supporting members is of a plate-shaped structure and has the first side, a second side, and two inclined sides; the first side and the second side are arranged opposite to one another, and a length of the second side is larger than a length of the first side; the first side of each of the supporting members is mounted to the back plate, one of the two inclined sides is connected with one end of the first side and one end of the second side, and the other one of the two inclined sides is connected to the other end of the first side and the other end of the second side.

3. The housing according to claim 2, wherein in each of the supporting members, the two inclined sides are symmetrical about a central line extending in a direction from the first side towards the second side, and a distance between each of the inclined side and the central line gradually increases along the direction from the first side towards the second side.

4. The housing according to claim 3, wherein each of the supporting members has a shape of an isosceles trapezoid or an annular sector.

5. The housing according to claim 4, wherein, in each curvature retaining unit, the first side of each of the supporting members is articulated to the back plate, and a pivot axis of an articulating device is consistent with an extending direction of the curvature retaining unit.

6. The housing according to claim 1, wherein the supporting members are made of glass, metal, carbon fiber or organic glass; and/or the back plate is made of glass, metal, carbon fiber or organic glass.

7. The housing according to claim 1, wherein a thickness of each of the supporting member is 0.5 to 10 times of a thickness of the back plate.

8. The housing according to claim 1, wherein a plurality of the curvature retaining units arranged in parallel with each other are mounted to the back plate, and each of the curvature retaining units is configured to, in the supporting state, retain the bent shape of the back plate in the same curvature.

9. The housing according to claim 1, wherein a plurality of the curvature retaining units arranged in parallel with each other are mounted to the back plate, and at least one of the curvature retaining units is configured to, in the supporting state, retain a bent shape of a portion of the back plate in a curvature different from that of a bent shape of another portion of the back plate when the back plate is retained by another curvature retaining unit in the supporting state.

10. The housing according to claim 1, wherein a part of the back plate is provided with at least one first curvature retaining unit, and another part of the back plate is provided with at least one second curvature retaining unit, the first curvature retaining unit and the second curvature retaining unit extend in the same direction and are spaced apart by a distance.

11. A display device, comprising:
a flexible display panel being elastically deformable to change its curvature; and
a housing comprising:
a back plate configured to be deformable to change its curvature; and
at least one curvature retaining unit located on a first side of the back plate that is convex when the back plate is bent,
wherein each curvature retaining unit includes a plurality of supporting members arranged in a row, a first side of each of the supporting members is pivotably mounted to the back plate, each curvature retaining unit has a non-supporting state in which the back plate is in a flat state and a supporting state in which two opposite sides of adjacent supporting members abut against each other such that the back plate is in a bent shape; and
wherein the display panel and the curvature retaining unit are respectively mounted at two opposite sides of the housing.

12. The display device according to claim 11, wherein each of the supporting members is of a plate-shaped structure and has the first side, a second side, and two inclined sides; the first side and the second side are arranged opposite to one another, and a length of the second side is larger than a length of the first side; the first side of each of the supporting members is mounted to the back plate, one of the two inclined sides is connected with one end of the first side and one end of the second side, and the other one of the two inclined sides is connected to the other end of the first side and the other end of the second side.

13. The display device according to claim 12, wherein in each of the supporting members, the two inclined sides are symmetrical about a central line extending in a direction from the first side towards the second side, and a distance between each of the inclined sides and the central line gradually increases along the direction from the first side towards the second side.

14. The display device according to claim 13, wherein each of the supporting members has a shape of an isosceles trapezoid or an annular sector.

15. The display device according to claim 14, wherein, in each curvature retaining unit, the first side of each of the supporting members is articulated to the back plate, and a pivot axis of an articulating device is consistent with an extending direction of the curvature retaining unit.

16. The display device according to claim 11, wherein the supporting members are made of glass, metal, carbon fiber or organic glass; and/or the back plate is made of glass, metal, carbon fiber or organic glass.

17. The display device according to claim 11, wherein a thickness of each of the supporting member is 0.5 to 10 times of a thickness of the back plate.

18. The display device according to claim 11, wherein a plurality of the curvature retaining units arranged in parallel with each other are mounted to the back plate, and each of the curvature retaining units is configured to, in the supporting state, retain the bent shape of the back plate in the same curvature.

19. The display device according to claim 11, wherein a plurality of the curvature retaining units arranged in parallel with each other are mounted to the back plate, and at least one of the curvature retaining units is configured to, in the supporting state, retain a bent shape of a portion of the back plate in a curvature different from that of a bent shape of another portion of the back plate when the back plate is retained by another curvature retaining unit in the supporting state.

20. The display device according to claim 11, wherein a part of the back plate is provided with at least one first curvature retaining unit, and another part of the back plate is provided with at least one second curvature retaining unit, the first curvature retaining unit and the second curvature retaining unit extend in the same direction and are spaced apart by a distance.

* * * * *